United States Patent
Dent (10) Patent No.: US 9,443,107 B2
(45) Date of Patent: Sep. 13, 2016

(54) METHOD FOR PROTECTING THE INTEGRITY OF A GROUP OF MEMORY ELEMENTS USING AN AGGREGATE AUTHENTICATION CODE

(71) Applicant: QUALCOMM Incorporated, San Diego, CA (US)

(72) Inventor: Alexander W. Dent, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 13/770,802

(22) Filed: Feb. 19, 2013

(65) Prior Publication Data

US 2014/0237611 A1 Aug. 21, 2014

(51) Int. Cl.
*G06F 7/04* (2006.01)
*G06F 21/64* (2013.01)
*G06F 21/79* (2013.01)
*H04L 9/32* (2006.01)
*H04L 9/08* (2006.01)
*H04L 9/14* (2006.01)

(52) U.S. Cl.
CPC .............. *G06F 21/64* (2013.01); *G06F 21/79* (2013.01); *H04L 9/0891* (2013.01); *H04L 9/14* (2013.01); *H04L 9/3242* (2013.01)

(58) Field of Classification Search
CPC ..... G06F 21/64; G06F 21/79; H04L 9/3242; H04L 9/14
USPC .............................. 726/26; 713/193; 380/277
See application file for complete search history.

(56) References Cited

U.S. PATENT DOCUMENTS

| 5,625,819 | A * | 4/1997 | Hoffer, Jr. | G06F 11/1441 |
| 6,697,380 | B1 * | 2/2004 | Egbert | H04L 45/742 370/412 |
| 7,913,092 | B1 * | 3/2011 | Hiltunen | G06F 21/54 713/187 |
| 8,132,073 | B1 * | 3/2012 | Bowers et al. | 714/755 |
| 8,510,596 | B1 * | 8/2013 | Gupta | G06F 11/073 714/15 |
| 2002/0018571 | A1 * | 2/2002 | Anderson et al. | 380/277 |
| 2002/0062330 | A1 * | 5/2002 | Paar et al. | 708/492 |
| 2004/0039924 | A1 * | 2/2004 | Baldwin et al. | 713/189 |
| 2007/0056041 | A1 * | 3/2007 | Goodman | 726/26 |

(Continued)

OTHER PUBLICATIONS

Deng et al, Efficiently Authenticating Code Image in Dynamically Reprogrammed Wireless Sensor Networks, Mar. 13, 2006, IEEE, pp. 1-5.*

(Continued)

*Primary Examiner* — Christopher Brown
*Assistant Examiner* — Jenise Jackson
(74) *Attorney, Agent, or Firm* — Loza & Loza, LLP (57) ABSTRACT

One feature pertains to an efficient algorithm to protect the integrity of a plurality of data structures by computing an aggregate message authentication code (MAC) over the plurality of data structures. An aggregate MAC may be constructed from a plurality of MAC values associated with a plurality of data structures. The aggregate MAC binds the plurality of data structures and attests to their combined integrity simultaneously. Rather than checking the integrity of a data structure when it is accessed, the aggregate MAC is periodically checked or verified, to ascertain the integrity of all data structures. If the aggregate MAC computed is different from the previously stored aggregate MAC, then all data structures that are part of the aggregate MAC are discarded.

39 Claims, 7 Drawing Sheets

(56) References Cited

U.S. PATENT DOCUMENTS

| | | | |
|---|---|---|---|
| 2007/0186287 A1* | 8/2007 | Slade | 726/27 |
| 2008/0222368 A1* | 9/2008 | Gehrmann | 711/152 |
| 2009/0089593 A1* | 4/2009 | Kuno et al. | 713/193 |
| 2010/0183146 A1* | 7/2010 | Leech | 380/28 |
| 2010/0290617 A1 | 11/2010 | Nath | |
| 2010/0306820 A1 | 12/2010 | Battistello et al. | |
| 2011/0118913 A1 | 5/2011 | Pretorius et al. | |
| 2012/0284523 A1* | 11/2012 | Kolesnikov et al. | 713/181 |
| 2014/0056306 A1* | 2/2014 | Kolesnikov | 370/393 |
| 2014/0223192 A1* | 8/2014 | Dent et al. | 713/189 |

OTHER PUBLICATIONS

Satran et al, Brief Contributions Out of Order Incremental CRC Computation, Sep. 2005, IEEE, vol. 54, No. 9, pp. 1178-1181.*
Kolesnikov V., et al., "MAC aggregation resilient to DoS attacks," 2011 IEEE International Conference on Smart Grid Communications (SmartGridComm), Oct. 2011, pp. 226-231.
Katz, et al. "Aggregate Message Authentication Codes," ITACS International Technology Alliance Collaboration System, CT-RSA Conference, Apr. 2008, 14 pages.

* cited by examiner

METHOD FOR PROTECTING THE INTEGRITY OF A GROUP OF MEMORY ELEMENTS USING AN AGGREGATE AUTHENTICATION CODE

BACKGROUND

1. Field

Various features relate to the protection of memory elements (e.g., data structures) from attacks by the use of an aggregate authentication code over a plurality of memory elements.

2. Background

Heap memory is reserved by a processor and is organized through the use of a meta-data structure. A meta-data structure may be a fixed-length data structure which contains information (e.g., in a header block) about which variable "owns" the next section of memory (if the memory is assigned) and the amount of memory that is reserved in the corresponding memory block. Attackers may wish to corrupt these meta-data structures (e.g., modify the header blocks) in order to reduce the amount of free memory or to ensure that certain important pieces of data are placed into vulnerable sections of memory. Hence, it is desirable to protect this meta-data (e.g., data in a data structure or header block of a memory block) to prevent unauthorized alteration of data structures.

Therefore, a computationally inexpensive solution is needed to protect memory elements (e.g., data structures).

SUMMARY

A method of protecting the integrity of elements in a memory space is provided. A list of memory elements is defined. The memory elements may be defined within a single memory heap region. An individual authentication code may also be obtained for each memory element. An aggregate authentication code may also be obtained by combining the individual authentication codes for each memory element in the list. In one example, the individual authentication codes may be combined by a reversible operation. The aggregate authentication code may then be stored in a memory device. The individual authentication codes for the elements in the list may be discarded after the aggregate authentication code is obtained. In one example, each memory element is a fixed-length data structure within a header block.

Subsequently, the integrity of the list may be verified by comparing a newly generated instance of an aggregate authentication code over the memory elements to the stored aggregate authentication code. If the integrity verification fails, the memory elements may be discarded.

Verifying the integrity of the list may be triggered by expiration of a time-based interval or counter-based between verifications. In various implementations, the interval between verifications may be periodic or aperiodic. In one example, verifying the integrity of the list is performed at an interval greater than a plurality of accesses of the memory elements in the list. The integrity of the list of elements may be verified instead of checking the integrity of each individual memory element when it is accessed.

The integrity of the list may also be verified by checking that each memory element in the list satisfies one or more constraints.

In one example, the aggregate authentication code may be updated when a memory element in the list changes by: (a) removing the previous individual authentication code for the changed memory element from the aggregate authentication code; and/or (b) adding a new individual authentication code for the changed memory element to the aggregate authentication code.

In another example, the aggregate authentication code may be updated when a memory element is removed from the list by removing the previous individual authentication code for the removed memory element from the aggregate authentication code.

In yet another example, the aggregate authentication code may be updated when a new memory element is added to the list by adding a new individual authentication code for the new memory element to the aggregate authentication code.

The aggregate authentication code may be stored in a secure memory location. The individual authentication code for each memory element may be obtained by: (a) obtaining a bounded list of n inputs associated with the memory element, where each input has a length of less than or equal to L; (b) obtaining a prime number p, where p>L; (c) generating a plurality of random keys, each key distributed within the range of 0 to p−1; (d) combining each key in a subset of keys with a corresponding input in the list of n inputs to obtain a plurality of transitory values; and/or (e) combining the plurality of transitory values and at least one unused key to generate the individual authentication code. Each key in the subset of keys and the corresponding memory element in the list may be combined by a multiplication. The plurality of transitory values may be combined by adding them together and performing a modulo p operation over the result. The prime number p may be prefixed and the plurality of random keys may be pre-generated upon start-up of a processing circuit or initiation of a session on the processing circuit. The plurality of random keys may be used for a plurality of aggregate of verification codes associated with different distinct lists of memory elements. If the aggregate authentication code is stored in an insecure memory location, it may be further protected by a mask prior to storage. If the aggregate authentication code is stored in a secure memory location, it may be stored without masking.

According to another aspect, a device is provided comprising a memory device coupled to a processing circuit. The memory device may be adapted to store a list of memory elements. The processing circuit configured or adapted to: (a) obtain an individual authentication code for each memory element; (b) obtain an aggregate authentication code by combining the individual authentication codes for each memory element in the list; (c) store the aggregate authentication code in the memory device, (d) verify the integrity of the list by comparing a newly generated instance of an aggregate authentication code over the memory elements to the stored aggregate authentication code, (e) discard the memory elements if the integrity verification fails.

The memory elements may be defined within a single memory heap region. Each memory element may be a fixed-length data structure within a header block. The integrity of the list of elements may be verified instead of checking the integrity of each individual memory element when it is accessed.

In one example, verifying the integrity of the list may be triggered by expiration of a time-based interval or counter-based between verifications.

In one example, verifying the integrity of the list may be performed at an interval greater than a plurality of accesses of the memory elements in the list.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

An efficient algorithm is provided to protect the integrity of a plurality of data structures by computing an aggregate message authentication code (MAC) over the plurality of data structures. An aggregate MAC may be constructed from a plurality of MAC values associated with a plurality of data structures. The aggregate MAC binds the plurality of data structures and attests to their combined integrity simultaneously.

The aggregate MAC can be formed, for example, by XOR-ing any number of individual MAC values (subject to the condition that each MAC is computed on a different data structure). Using XORing operations (or any other self-inverting operation) also allows the aggregate MAC to be updated quickly. If a data structure changes, then the original MAC value corresponding to the original instance of the data structure is stripped from the aggregate MAC and the new MAC value for the new instance of the data structure is added into the aggregate MAC.

Additionally, according to another aspect, rather than checking the integrity of a data structure when it is accessed, the aggregate MAC is periodically checked or verified, to ascertain the integrity of all data structures. If the aggregate MAC computed is different from the previously stored aggregate MAC, then all data structures that are part of the aggregate MAC are discarded. Thus, rather than spending resources every time one of the data structures is accessed, the aggregate MAC is verified periodically. This approach may save significant processing resources as the integrity of a data structure is verified less frequently.

Exemplary Aggregate MAC Computation

Figure 1:
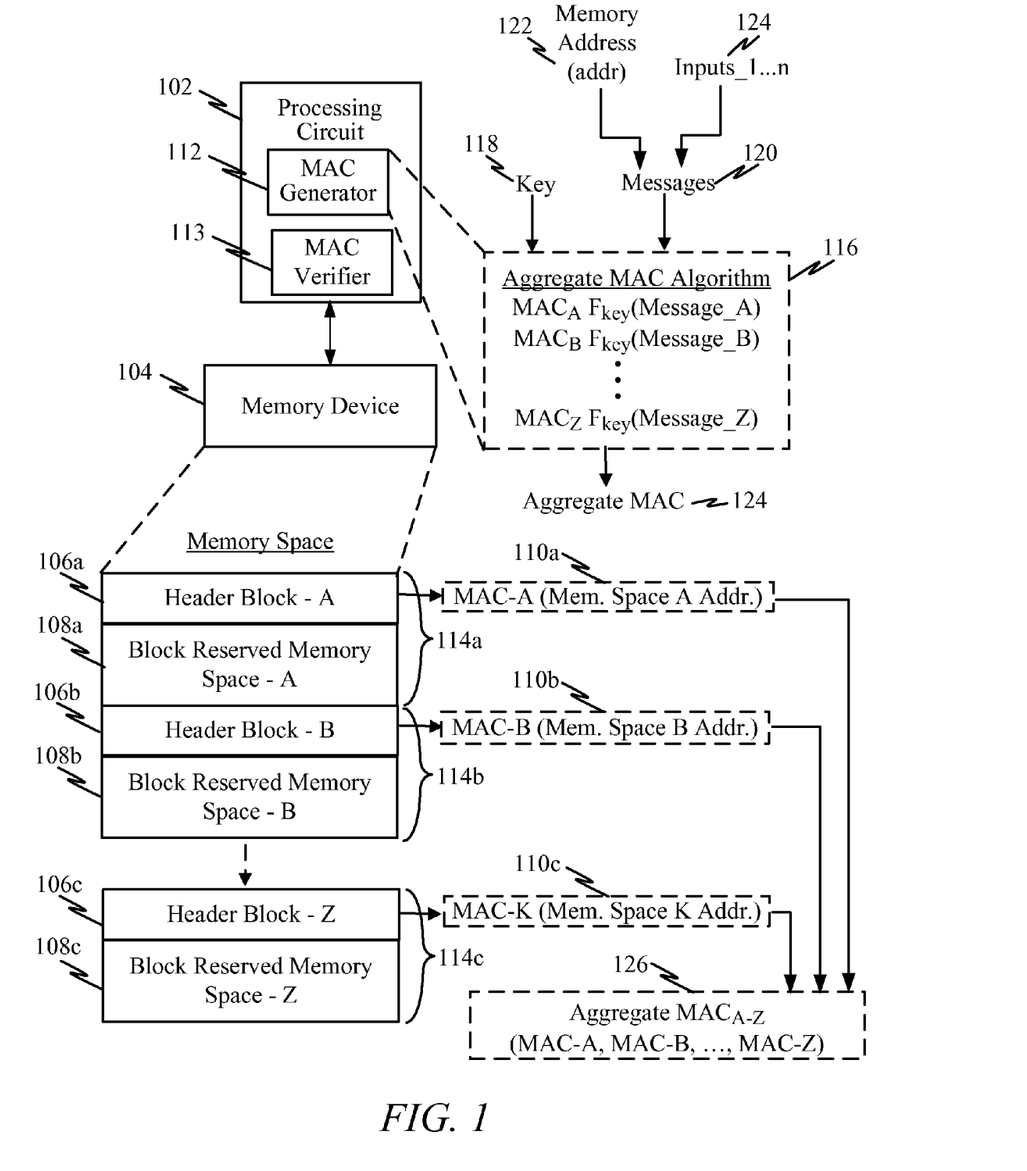
FIG. 1 is a block diagram illustrating one approach to protecting a list of memory elements (e.g., data structures in memory) with an aggregate authentication code.

FIG. 1 is a block diagram illustrating one approach to protecting a list of memory elements (e.g., data structures in memory) with an aggregate authentication code. A processing circuit 102 may be coupled to, and/or or integrates, a memory device 104 or storage. The memory device 104 may include memory space that is arranged as memory blocks 114a, 114b, and/or 114c. Each memory block 114a, 114b, 114c may include a header block 106a, 106b, and 106c, and a corresponding block reserved memory space 108a, 108b, and 108c. The header block 106 may serve to store a data structure (e.g., meta-data structure).

The processing circuit 102 may be configured to implement a MAC generator 112 that computes an individual MAC 110a, 110b, 110c for each header block 106 (e.g., data structure) or memory block 114 and then computes an aggregate $MAC_{A-Z}$ 126 by combining the individual MACs 110a, 110b, and 110c.

In one example, the MAC generator (e.g., a processing circuit or module) may implement a particular MAC algorithm 116 (e.g., Hash-based Message Authentication Code (HMAC)-Secure Hash Algorithm 1 (SHA-1), Advanced Encryption Standard (AES)-cipher-based MAC (CMAC), and Data Authentication Algorithm (DAA), etc.). Other types of authentication code algorithms are also contemplated herein. The aggregate MAC algorithm 116 may accept as input a secret key 118 and/or a plurality of arbitrary-length messages 120 to be authenticated, and outputs an aggregate MAC 124. The aggregate MAC algorithm 116 computes individual MACs for each input message, and combines (e.g., in a reversible operation) the individual MACs into the aggregate MAC 124. The aggregate MAC 124 allows the integrity of the plurality of messages (e.g., data structures) to be verified by detecting any changes to the messages (e.g., header block 106, data structure, and/or memory block 114).

In various examples, the MAC algorithm 116 may include, as part of the "message" input 120, a memory address 122 at which the header block begins, the block reserved memory space begins, and/or where specific meta-data in the data structure is held. Additionally, the MAC algorithm 116 may also include, as part of each "message" input 120, other inputs 1 . . . n 124 such as content of the header block (e.g., data structure stored therein). Because an individual MAC is computed based on at least some of the information in the corresponding header block (e.g., memory address for the memory block or block reserved memory space, size of memory block, or block reserved memory space, etc.), any attempt to tamper with any of the header blocks, the address for the memory blocks, or block reserved memory space, and/or size of the corresponding memory block, and/or block reserved memory space can be detected by verifying the corresponding aggregate MAC 124.

A MAC verifier 113 within the processing circuit 102 serves to periodically or asynchronously/aperiodically check and verify the aggregate MAC to ascertain the integrity of the data structure associated with the individual MACs. Such verification of the aggregate MAC may be performed in lieu of verifying a data structure, block header, and/or memory block when it is accessed. For instance, if a memory block 114a (e.g., and/or the data structure in the corresponding header block 106a) is accessed often, which is likely in the case where the data structure holds the information about memory allocation for a heap memory structure, then verification of the individual MAC 110a on every access may consume unacceptable processing resources. Consequently, these processing resources may be saved by avoiding individual MAC verification when accessing a data structure, block header 106a, and/or memory block 114a. Instead of checking the individual MACs 110a, 110b, 110c when the data structure or header block 106a, 106b, 106c is accessed, a less frequent verification of the aggregate $MAC_{A-Z}$ 126 may be performed. For example, the aggregate $MAC_{A-Z}$ 126 may be checked every n accesses of data structures or header blocks, where n=10, 50, 100, 200, etc. In another example, the aggregate $MAC_{A-Z}$ 126 may be checked periodically, e.g., every 1 second, 3 seconds, 10 seconds, etc. In other instances, other time-based or counter-based interval may be used to trigger an aggregate MAC verification. The interval(s) between aggregate MAC verifications may be sufficiently long that it takes less processing resources to perform the aggregate MAC verification for a plurality of data structures instead of individual MAC verification for each data structure. Such aggregate MAC verification may be performed, for example, by a memory controller circuit (e.g., implemented within the processing circuit 102), an operating system, and/or other low-level application.

Figure 2:
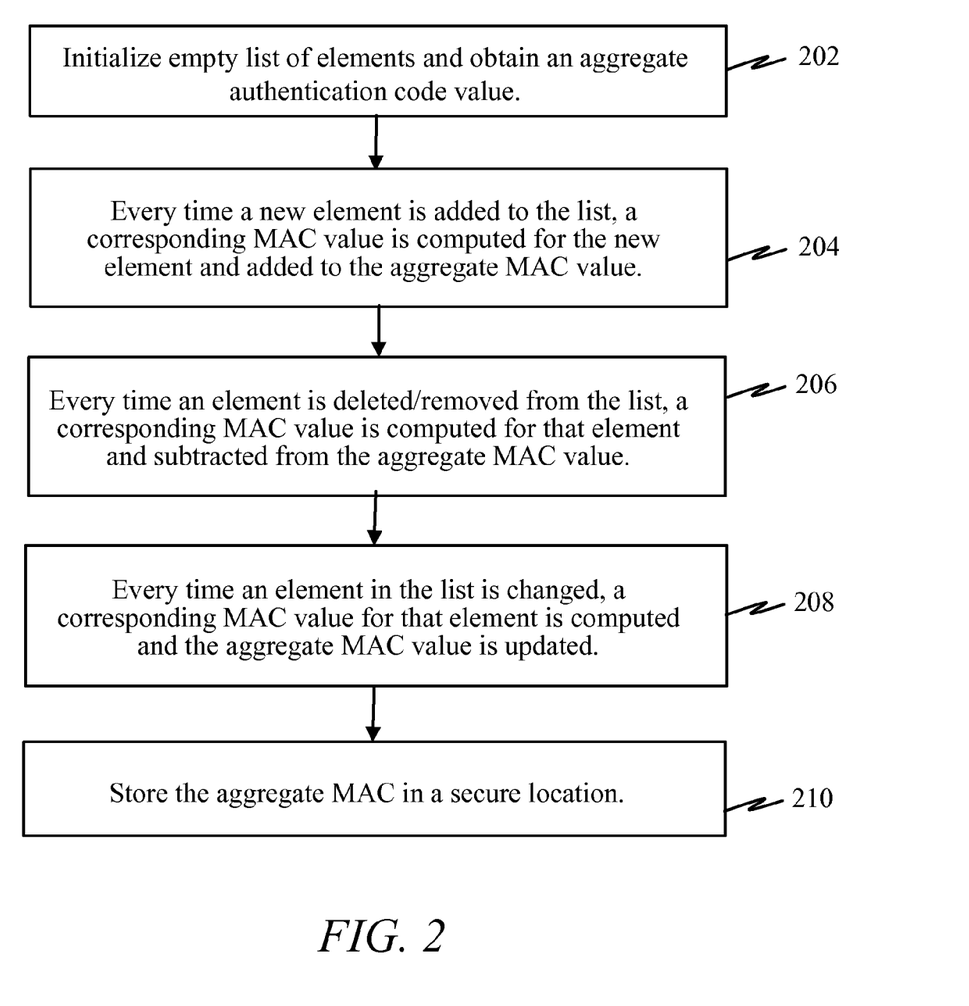
FIG. 2 illustrates one example of how an aggregate authentication code may be computed for a list/plurality of memory elements (e.g., data structures, packets, memory blocks, etc.).

FIG. 2 illustrates one example of how an aggregate authentication code may be computed for a list/plurality of memory elements (e.g., data structures, packets, memory blocks, etc.). To compute the aggregate MAC, an empty list of elements list is initialized (e.g., bitwise aggregate MAC="000000") and an aggregate MAC value is obtained 202. For instance, the aggregate MAC value may be set to be an appropriately-sized string of zeroes. Every time a new memory element is added to the list, a corresponding MAC value is computed for that element and added (e.g., by a reversible operation, such as a XOR operation) to the aggregate MAC value 204. For example, for a new element having a MAC="000101", the updated aggregate MAC="000000" XOR "000101"="000101".

Every time an element is deleted from the list, a corresponding MAC value is computed for that element and subtracted/removed (e.g., XORed) from the aggregate MAC value 206. For example, starting with an aggregate MAC="000101", for an element to be deleted having a MAC="000100", the updated aggregate MAC="000101" XOR "000100"="000001".

Every time an element in the list is changed, a corresponding MAC value for that element is computed and the aggregate MAC value is updated 208. For instance, the aggregate MAC value may be updated by subtracting/removing the previous MAC value corresponding to the element (e.g., using a XOR operation) and then adding/combining (e.g., using a XOR operation) the new MAC value (e.g., using a XOR operation). For example, if the aggregate MAC="000101", and an element changes from "001001" to "010010", then the updated aggregate MAC="000101" XOR "001001" XOR "010010"="011110". Note that, in addition to a logic XOR operation, other invertible operations may be used to add and/or remove MAC values to/from an aggregate MAC.

In another example, rather than subtracting the previous MAC for the element and adding the new MAC to the aggregate MAC, the aggregate MAC may be recomputed using the new MAC for the element along with the individual MACs for the other elements in the list. The aggregate MAC may then be stored in a secure location 210.

Figure 3:
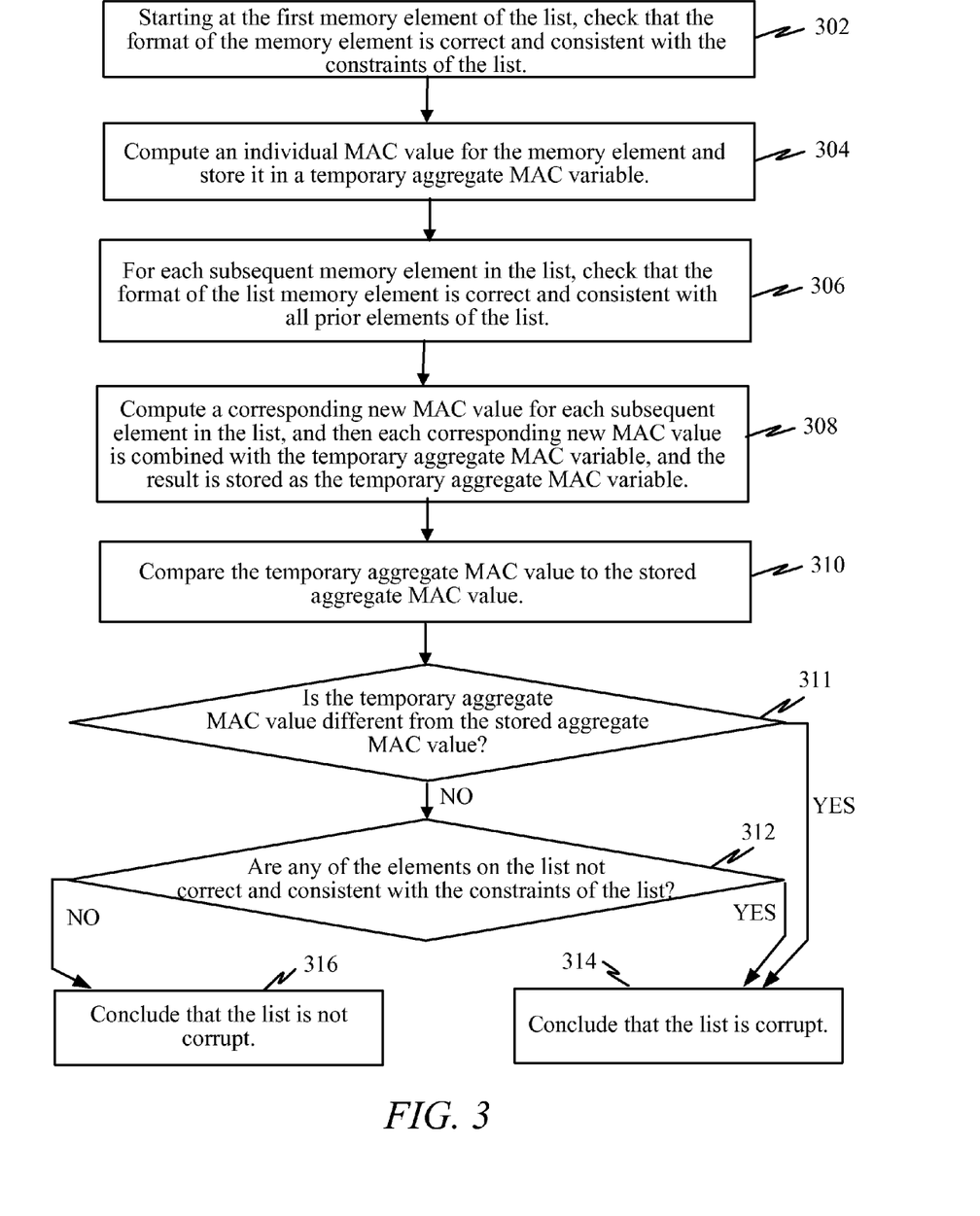
FIG. 3 illustrates an example of how the integrity of the elements in a list may be verified using an aggregate authentication code.

FIG. 3 illustrates an example of how the integrity of the elements in a list may be verified using an aggregate authentication code. Starting at the first element of the list, the format of each element may be checked to make sure it is correct and consistent with the constraints of the list 302. For example, this check may verify that an element has not been surreptitiously added to the list and/or that an element in the list has not been corrupted and/or surreptitiously modified (e.g., length/size of element has been changed, etc.).

An individual MAC value of the list element is then computed and stored in a temporary aggregate MAC variable 304. For each subsequent element in the list (which can be identified from the prior element), check that the format of the element is correct and consistent with all prior elements of the list and the constraints of the list 306. A corresponding new individual MAC value is computed for each subsequent element, and then each corresponding new individual MAC value is combined (e.g., XORed) with the temporary aggregate variable, and the result is stored as the temporary aggregate MAC variable 308. Once every element of the list has been considered, the temporary aggregate MAC value is compared to the stored aggregate MAC value 310. If the temporary aggregate MAC value is different from the stored aggregate MAC value 311 or any of the elements on the list is not correct and consistent with the constraints of the list 312, then it may be concluded that the list is corrupt 314. Otherwise, it may be concluded that the list is not corrupt 316. This procedure may check or verify the integrity of the list of elements: (a) when an element in the list altered, modified, or changed, (b) in response to some other aperiodic trigger event, and/or (c) periodically triggered by a timer. That is, in contrast to some other integrity checking/verification approaches that may perform MAC verification upon accessing data stored in a corresponding memory area (e.g., corresponding to an element in the list, such as a data structure), the present approach may verify the aggregate MAC value at other intervals or instances (e.g., when the data secured by the aggregate MAC value is not necessarily when being accessed or retrieved). In some examples, the integrity of each individual element in the list may not be verified upon accessing corresponding data in memory but instead relies on verification of the aggregate MAC value. If verification of the aggregate MAC value fails, the whole list of elements may be considered compromised/corrupt and may be discarded. Additionally, the system(s), processing circuit(s), and/or application(s) that use one or more elements in the list may be reset, rebooted, and/or restarted if it is concluded or assumed that the aggregate MAC value verification fails.

Figure 4:
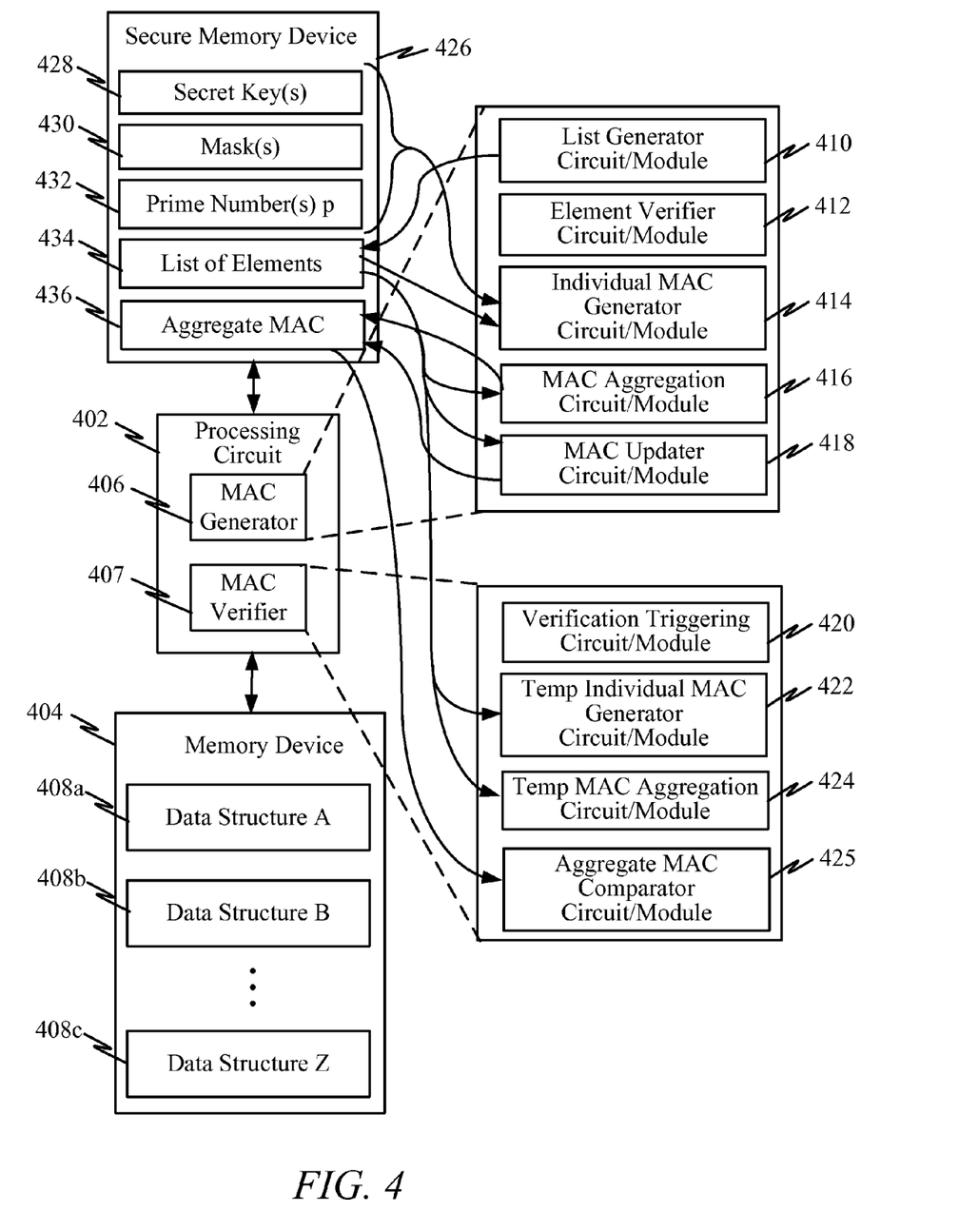
FIG. 4 is a block diagram illustrating an exemplary device that may be adapted to secure the integrity of a plurality of elements by use of an aggregate authentication code.

FIG. 4 is a block diagram illustrating an exemplary device that may be adapted to secure the integrity of a plurality of elements by use of an aggregate authentication code. The device may include a processing circuit 402 coupled to a separate or integrated memory device 404. The processing circuit 402 may include a message authentication code (MAC) generator 406 that may be adapted to generate an aggregate MAC for a plurality of data structures 408a, 408b, and 408c, stored in the memory device 404 to secure the integrity of the plurality of data structures.

The MAC generator 406 may include a plurality of circuits and/or modules that implement one or more functions or steps to generate the aggregate MAC. A list generator circuit/module 410 may serve to build a list of elements 434, such as a plurality of the data structures 408a, 408*b*, and 408*c* in the memory device 404. An element verifier circuit/module 412 may serve to verify that the elements satisfy any conditions and/or constraints associated with the list. An individual MAC generator circuit/module 414 may implement a MAC algorithm that computes an individual MAC for each element (e.g., data structure) in the list. To do this, the MAC generator circuit/module 414 may obtain one or more secret keys 428, masks, 430, and/or a prime number 432 from a secure memory device 426, a secure location within the processing circuit 402, or the memory device 404, and use them to compute the individual MACs. Each individual MAC may be added to an aggregate MAC 436 by a MAC aggregation circuit/module 416. For example, a plurality of individual MACs (MAC-A, MAC-B, MAC-C, . . . , MAC-Z), each corresponding to a different element in the list of elements 434, may be combined by self-inverting operations (e.g., aggregate MAC=MAC-A XOR MAC-B XOR MAC-C XOR . . . MAC-Z). The aggregate MAC 432 may be updated, by a MAC updater circuit/module 418, when or if an element previously added to the list 430 changes or is removed. For example, when a new element is added to the list of elements 434, the corresponding individual MAC (e.g., MAC-new) may be added to the aggregate MAC 436 by using a self-inverting operation (e.g., updated aggregate MAC=old aggregate MAC XOR MAC-new). Similarly, when an element is removed from the list of elements 434, the corresponding individual MAC (e.g., MAC-remove) may be removed from the aggregate MAC 436 by using a self-inverting operation (e.g., updated aggregate MAC=old aggregate MAC XOR MAC-remove). Likewise, when an element from the list of elements 434 changes and needs to be updated, the corresponding old individual MAC (e.g., MAC-old) may be removed from the aggregate MAC 436 and the corresponding new individual MAC (e.g., MAC-new) may be added to the aggregate MAC 436 by using a self-inverting operation (e.g., updated aggregate MAC=old aggregate MAC XOR MAC-old XOR MAC-new). Note that the self-inverting operation used to add an individual MAC may be the same operation used to remove and/or update the individual MAC.

The processing circuit 402 may also include a MAC verifier 407 that is adapted to verify the aggregate MAC 436 upon a triggering event (e.g., aperiodic) and/or periodically. The MAC verifier 407 may include a verification triggering circuit/module 420 that indicates when an aggregate MAC should be verified. For instance, the verification triggering circuit/module 420 may operate off a periodic or aperiodic timer, an event counter, or an external event. In one example, a periodic timer may be setup and the verification triggering circuit/module 420 triggers an aggregate MAC verification at the interval indicated by such timer. In another example, a counter of element accesses is maintained (e.g., how many times the elements in the list have been accessed since the last verification) and used by the verification triggering circuit/module 420 to initiate an aggregate MAC verification when a triggering number is reached. Note that the MAC verifier 407 may reuse and/or share one or more of the circuits/modules in the MAC generator 406. For instance, in order to perform one or more of its functions, the MAC verifier 407 may use and/or access the element verifier circuit/module 412 (e.g., to make sure an element has not been compromised and/or still satisfies the constraints associated with the list). Similarly, the individual MAC generator circuit/module 414 and/or MAC aggregation circuit/module 416 may be reused by one or more of the circuits/modules of the MAC verifier 407 to perform the aggregate MAC verification functions (e.g., compute individual MACs for the list of elements and compute a temporary aggregate MAC to compare to the existing aggregate MAC).

Upon accessing a data structure, for a write operation or read operation, a key selector circuit/module 414 may select a plurality of keys from the set of keys 428 based on at least one input associated with the data structure (e.g., a variable memory address for the data structure, etc.). Similarly, a mask selector circuit/module 416 may select a mask from the set of masks 430 based on the at least one input (e.g., a variable memory address for the data structure, etc.) or a different one or more inputs associated with the data structure.

A MAC comparator circuit/module 424 may serve to check the integrity of a data structure by comparing a previously stored MAC value for the data structure to a dynamically computed MAC value (from the mask combining circuit/module 422).

Figure 5:
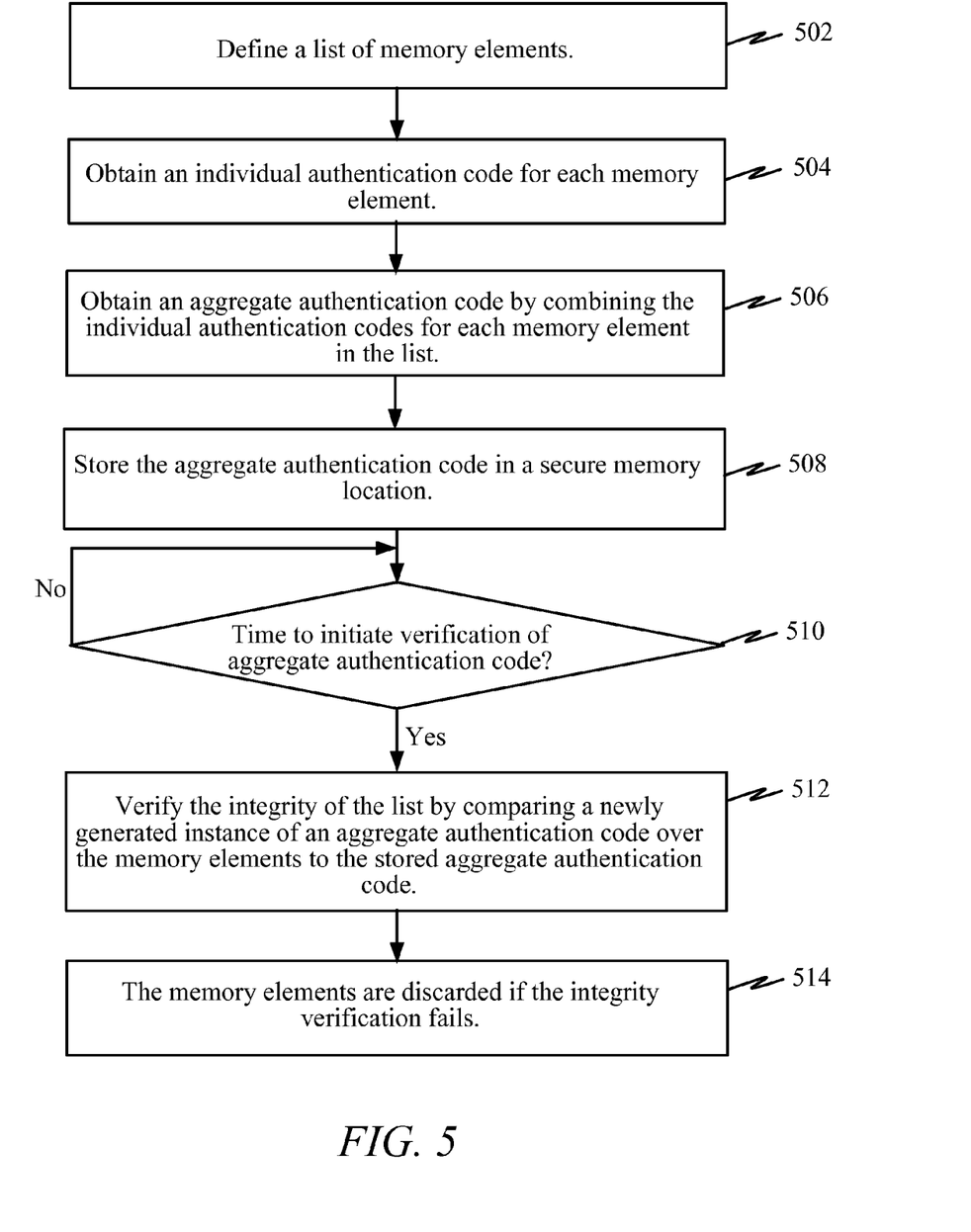
FIG. 5 illustrates a method of protecting the integrity of elements in a memory space by use of an aggregate authentication code.

FIG. 5 illustrates a method of protecting the integrity of elements in a memory space by use of an aggregate authentication code. A list of memory elements is defined 502 and an individual authentication code is obtained for each memory element 504. An aggregate authentication code is then obtained by combining the individual authentication codes for each memory element in the list 506. The aggregate authentication code is then stored in a secure memory location 508.

Subsequently, a determination is made if it is time to initiate verification of the aggregate authentication code 510. Such determination may be made, for example, based on a counter or timer (e.g., either periodic or event triggered). For instance, a timer may be used to track a periodic interval at which the aggregate authentication code is verified or checked. In another example, a counter may track the number of elements (e.g., data structures in memory) have been accessed since the last verification was performed, and if it is equal to or greater than a threshold number, then verification of the aggregate authentication code is performed.

In an example where the memory elements are memory blocks or data structures (e.g., within heap memory), rather than checking the authentication code for each memory block or data structure individually when such memory block or data structure is accessed, only the aggregate authentication code is checked (verified) for the whole list of elements. The interval between verifications of the aggregate authentication code may be longer than typical intervals between individual memory block or data structure verifications. In one example, the interval between verifications may be greater than a plurality of accesses (e.g., 5, 10, 30, 50, 10, or 300 accesses) of the memory elements in the list.

The aggregate authentication code, which serves to secure the integrity of the list of elements, may be verified by comparing a newly generated instance of an aggregate authentication code over the memory elements to the (previously) stored aggregate authentication code 512. The memory elements in the list are discarded (e.g., flushed, deleted, etc.) if the integrity verification fails 514. In one example, the integrity of the list of elements is verified instead of checking each individual element when it is used. The individual authentication codes for the elements may be discarded after the aggregate authentication code is obtained. Additionally, the integrity of the list may be verified by checking that each element in the list satisfies one or more constraints. In one example, the memory elements may be defined within a single memory heap region. For instance, each memory element may be a fixed-length data structure (e.g., meta-data structures) within a header block. The individual authentication codes may be aggregated, for example, by a reversible operation (e.g., XOR operation). In some implementations, the individual authentication codes may be discarded after the aggregate authentication code is generated or updated, thus The aggregate authentication code may be updated when an element changes by: (a) removing the previous individual authentication code for the element from the aggregate authentication code; and/or (b) adding a new individual authentication code for the element to the aggregate authentication code. Similarly, the aggregate authentication code may be updated when an element is removed from the list by removing the previous individual authentication code for the element from the aggregate authentication code. Likewise, the aggregate authentication code may be updated when a new element is added to the list by removing the previous individual authentication code for the element from the aggregate authentication code.

Exemplary Low-Complexity MAC Algorithm

The examples of authentication code aggregation illustrated in FIGS. 1-5 may work with any existing MAC algorithm (e.g., HMAC-SHA-1, AES-CMAC, DAA, etc.) to compute the individual MACs. Additionally, various combinatorial operations may be used to combine the individual MACs into the aggregate MAC, although it is most efficient when used with an aggregate MAC algorithm that has an efficient procedure for adding and removing individual MAC values (e.g., such reversible operations, XOR, etc.).

In some implementations, if the aggregate MAC value is stored in an area of memory to which an attacker cannot be reasonably assumed to have read access (e.g., a secure memory device), then all elements (e.g., individual MACs, keys, etc.) of the aggregate MAC value construction which are required to protect the confidentiality of certain data in the aggregate MAC construction can be removed or discarded.

In one implementation, a MAC based on universal hashing, referred to as UMAC, may be used in the construction of the individual MACs for each element in a list. Typical UMACs are a type of MAC that use a computationally expensive pseudorandom function (PRF) computation and a nonce to protect the confidentiality of an underlying universal hash by XORing the output of the universal hash function with the output of the PRF (evaluated on the nonce) which serves as a mask.

In one aspect, this (expensive) mask can be removed, if the individual MAC value is stored in an area of memory to which the attacker has no read access.

Figure 6:
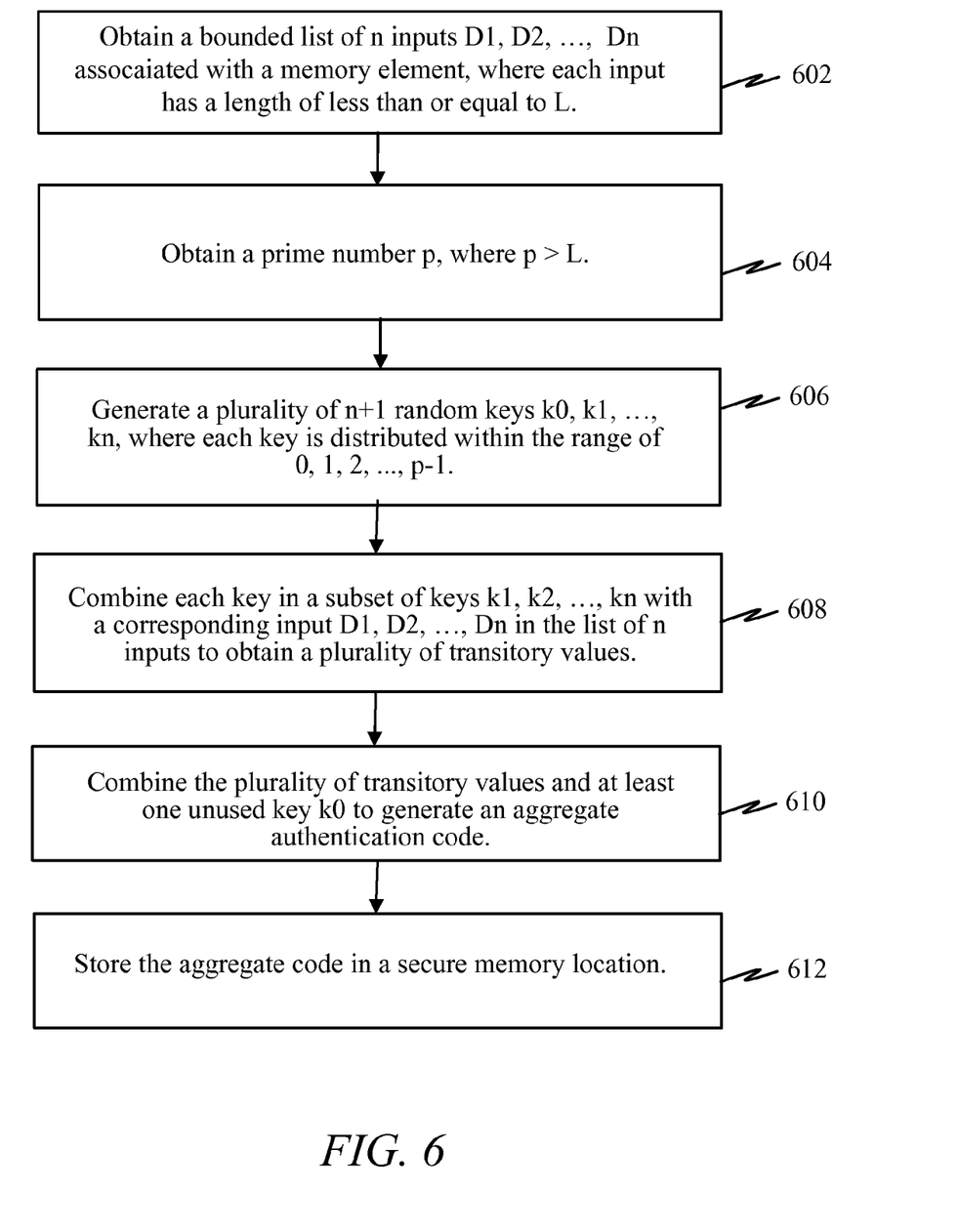
FIG. 6 illustrates a method for a low-complexity authentication code algorithm to generate an individual message authentication code for a memory element.

FIG. 6 illustrates a method for a low-complexity authentication code algorithm to generate an individual message authentication code for a memory element. For each memory element, a corresponding plurality of inputs may be obtained. The inputs may be, for example, an address, data segments, variables, etc., corresponding to or found within a memory element. For example, if the memory element is a memory block, the inputs may be a memory address where a corresponding header block is located and information found in a header block for the memory block.

If the list inputs are of bounded size (as is the case in heap memory data structures) then a simple affine transformation may act as a "MAC" for the purposes of constructing an individual MAC value for each memory element. For example, a bounded list of n inputs $D1, D2, \ldots, Dn$ associated with the memory element is obtained, where each input has a length of less than or equal to L 602. Also, a prime number p is obtained, where p>L 604. A plurality of n+1 random keys $k0, k1, \ldots, kn$ are generated, where each key is (an integer) distributed (e.g., uniformly) within the range $0, 1, 2, \ldots, p-1$ 606. Note that, the plurality of n+1 random keys $k0, k1, \ldots, kn$ may be pre-generated, for example, prior to boot-up or start-up and/or during a session initiation and used in generating the individual authentication codes for one or more distinct lists of memory elements from which the aggregate authentication code is obtained. In one example, the prime number p may be prefixed and the plurality of random keys is pre-generated upon start-up of a processing circuit or initiation of a session on the processing circuit. Such plurality of random keys may be used, for example, for the duration of a session (between start-ups) for a plurality of authentication codes associated with different memory regions and/or distinct lists of memory elements. Alternatively, the random keys may be dynamically generated when needed to generate an individual authentication code and/or an aggregate authentication code.

Each key in a subset of keys $k1, k2, \ldots, kn$ is combined (e.g., by a multiplication operation, by a logic operation, etc.) with a corresponding input $D1, D2, \ldots, Dn$ in the list of n inputs to obtain a plurality of transitory values 608. Each of the inputs $D1, D2, \ldots, Dn$ may be converted or interpreted as a number for purposes of this combination operation (e.g., arithmetic or logic operation). For instance, each input may be treated as a bit string where the value of the bit string is treated as an integer number). In one example, the combination of each key and corresponding input may be by a multiplication operation to obtain a transitory value. An individual authentication code may then be generated by combining the plurality of transitory values and at least one unused or additional key $k0$ 610. For instance, such combination of transitory values and at least one unused key may be through arithmetic operations, such as addition operations, or logic operations. Additionally, a modulo operation (using the prime number p) may also be performed on the authentication code. The aggregate authentication code may then be stored in a secure memory location or device 612.

In one example, an individual $MAC=(k0+k1\times D1+k2\times D2+\ldots+kn\times Dn)$ (modulo p), where "x" denotes multiplication modulo p. In comparison to traditional cryptographic MAC algorithms that rely on a PRF to generate a mask, this is very efficient approach since such computationally expensive operation is avoided.

In a subsequent access of the fixed-length data structure, its integrity may be verified by regenerating the message authentication code and comparing it to a previously stored message authentication code for the same data structure.

Figure 7:
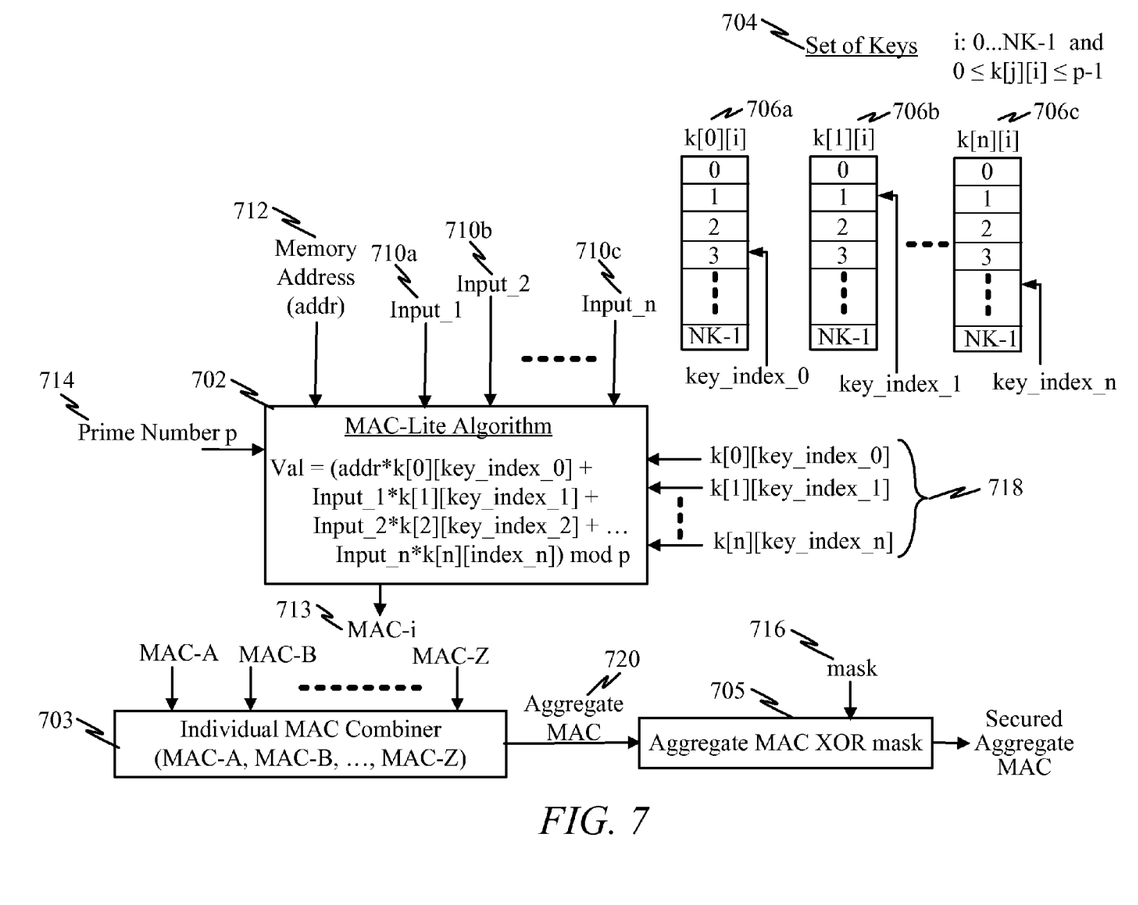
FIG. 7 illustrates an example of a computationally efficient MAC-Lite algorithm that may serve to compute individual authentication codes and an aggregate authentication code.

FIG. 7 illustrates an example of a computationally efficient MAC-Lite algorithm 702. This MAC-Lite algorithm 702 may be implemented, for example, by the MAC generator 414 in FIG. 4 to efficiently implement the individual MACs.

In this approach, a set of keys 704 and/or masks 706 may be pre-generated at boot-time and/or startup and may be subsequently used (e.g., during an entire session) to generate individual MACs for one or more memory blocks or elements of an aggregate authentication code. For instance, a plurality of keys 704 $k[0][0], \ldots, k[n][NK-1]$ may be randomly or pseudo-randomly generated (e.g., generated based on a random or pseudo-random value). In this example, the plurality of keys 704 $k[0][0], \ldots, k[n][NK-1]$ have been grouped into a plurality of subsets 706a, 706b, and 706c, including a first subset of keys 706a $k[0][0], \ldots, k[0][NK-1]$, a second subset of keys 706b $k[1][0], \ldots, k[1][NK-1]$, and a third subset of keys 706c k[n][0], . . . , k[n][NK−1]. These key values should be secret and unchangeable by a potential attacker.

In this example of the MAC-Lite algorithm 702 may take as inputs: a plurality of inputs Input_1 710*a*, Input_2 710*b*, and Input_n 710*c*, a variable memory address 712, a pre-selected or pre-determined prime number p 714, and/or a selected plurality of keys 718 selected from the set of keys 704. In one example, the key values k[0][0], . . . , k[n][NK−1], in the set of keys 704, may be between 0 and p−1 (inclusive).

For a given memory block, an individual MAC may be generated using the MAC-Lite algorithm 702. The plurality of keys 718 may be selected from the set of keys 704 based on, for example, one or more indices generated from the variable memory address 712. For example, a function f and the variable memory address 712 addr may serve to generate the key indices: f(addr)=key_index_0, . . . , key_index_n. For instance, each of the key indices may be between integer values 0 and NK−1. Consequently, the selected set of keys 718 may be selected from each of the subsets 706*a*, 706*b*, and 706*c* of the plurality of keys 704.

The selected plurality of keys 718, the prime number p 714, and the variable memory address 712, input_1 710*a*, input_2 710*b*, . . . , input_n 710 may be combined in a way that produces a MAC output that is hard to predict. For the case of memory management, the variable memory address (addr) 712 may be, for example, a starting address for a header block of memory structure. Likewise, the plurality of other inputs input_1 710*a*, input_2 710*b*, . . . , input_n 710*c* may be different variables or data segments in the data structure or header block. The MAC-Lite algorithm 702 may be parameterized by the prime number p 714 which may be larger than any possible individual input (e.g., k[j][i]≤p−1), which can be determined owing to the assumption that the input characteristics for the MAC-Lite algorithm 702 are known. This prime number p 714 may be smaller than some possible inputs (e.g., selected keys 718, memory address 712, and/or inputs 710) as long as it is possible to efficiently map the set of a possible inputs to a set of inputs that are all guaranteed to be less than the prime number p 714 in a bijective way. This also allows small inputs to be combined into one larger input variable. This prime number p 714 can be made public, but should not be changeable by an attacker.

In an alternative implementation, the keys (e.g., selected keys 718) and inputs (e.g., memory address 712, and/or inputs 710) may also be implemented using an arbitrary finite field GF($2^n$) by mapping the keys and/or inputs into elements of the finite field.

In one example, the MAC-Lite algorithm 702 may generate a MAC value 713 as:

MAC value=addr*key[0][key_index_0]+input_1*$k$[1][key_index_1]+input_2*$k$[2][key_index_2]+ . . . +input_$n$*key[$n$][key_index_$n$] mod $p$.

In this manner, a plurality of MAC values (MAC-A, MAC-B, . . . , MAC-Z) may be computed for a plurality of memory blocks.

Then, a combiner 703 may combine the plurality of individual MAC values to generate an aggregate MAC 720. The aggregate MAC may then be stored in a secure memory location, without the need of masking.

Otherwise, if the aggregate authentication code is stored in an insecure memory location, a mask 716 may be used to secure 705 the aggregate MAC (e.g., by XORing the aggregate MAC 720 with the mask 716) such that:

Secured_Aggregate_MAC=Aggregate_MAC XOR mask.

One or more of the components, steps, features, and/or functions illustrated in the Figures may be rearranged and/or combined into a single component, step, feature or function or embodied in several components, steps, or functions. Additional elements, components, steps, and/or functions may also be added without departing from the invention. The apparatus, devices, and/or components illustrated in the Figures may be configured to perform one or more of the methods, features, or steps described in the Figures. The algorithms described herein may also be efficiently implemented in software and/or embedded in hardware.

Moreover, in one aspect of the disclosure, the processing circuit 102 and/or 402 illustrated in FIGS. 1 and 4 may be a specialized processor (e.g., an application specific integrated circuit (e.g., ASIC)) that is specifically designed and/or hard-wired to perform the algorithms, methods, and/or steps described in FIGS. 2, 3, 5, 6 and/or 7. Thus, such a specialized processor (e.g., ASIC) may be one example of a means for executing the algorithms, methods, and/or steps described in FIGS. 2, 3, 5, 6 and/or 7. The processor-readable storage medium may store instructions that when executed by a specialized processor (e.g., ASIC) causes the specialized processor to perform the algorithms, methods, and/or steps described herein.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of protecting the integrity of elements in a memory space, comprising:
    defining a list of inputs associated with the memory elements in the memory space;
    generating an individual authentication code for each memory element in the list by combining a random key with a corresponding input in the list using a first operation;
    generating an aggregate authentication code by combining the individual authentication codes for each memory element in the list using a second operation;
    storing the aggregate authentication code in a memory device, wherein the aggregate authentication code is configured to authenticate access to one or more elements in the memory space;
    verifying the integrity of the list by comparing a newly generated instance of an aggregate authentication code over the memory elements to the stored aggregate authentication code; and
    discarding the memory elements if the integrity verification fails.

2. The method of claim 1, wherein verifying the integrity of the list is triggered by expiration of a time-based interval or counter-based between verifications.

3. The method of claim 2, wherein the interval between verifications is periodic and aperiodic based on a respective periodic timer, an aperiodic timer, an event counter and an external event.

4. The method of claim 1, wherein the list of inputs associated with the memory elements in the memory space is initialized and a number of inputs thereof changes over time.

5. The method of claim 1, wherein verifying the integrity of the list is performed at an interval greater than a plurality of accesses of the memory elements in the list.

6. The method of claim 1, wherein the integrity of the list of elements is verified instead of checking the integrity of each individual memory element when it is accessed.

7. The method of claim 1, further comprising:
    discarding the individual authentication codes for the elements in the list after the aggregate authentication code is obtained.

8. The method of claim 1, further comprising:
    verifying the integrity of the list by checking that each memory element in the list satisfies one or more constraints.

9. The method of claim 1, wherein the memory elements are defined within a single memory heap region organized through the use of a meta-data structure.

10. The method of claim 9, wherein each memory element is a fixed-length data structure within a header block comprising meta-data information.

11. The method of claim 1, wherein the individual authentication codes are combined by a reversible operation.

12. The method of claim 1, further comprising:
    updating the aggregate authentication code when a memory element in the list changes by:
        removing the previous individual authentication code for the changed memory element from the aggregate authentication code; and
        adding a new individual authentication code for the changed memory element to the aggregate authentication code.

13. The method of claim 1, further comprising:
    updating the aggregate authentication code when a memory element is removed from the list by:
        removing the previous individual authentication code for the removed memory element from the aggregate authentication code.

14. The method of claim 1, further comprising:
    updating the aggregate authentication code when a new memory element is added to the list by:
        adding a new individual authentication code for the new memory element to the aggregate authentication code.

15. The method of claim 1, wherein the aggregate authentication code is stored in a secure memory location, and the individual authentication code for each memory element is obtained by:
  obtaining a bounded list of n inputs associated with the memory element, where each input has a length of less than or equal to L;
  obtaining a prime number p, where p>L;
  generating a plurality of random keys, each key distributed within the range of 0 to p-1;
  combining each key in a subset of keys with a corresponding input in the list of n inputs to obtain a plurality of transitory values; and
  combining the plurality of transitory values and at least one unused key to generate the individual authentication code.

16. The method of claim 15, wherein each key in the subset of keys and the corresponding memory element in the list are combined by a multiplication.

17. The method of claim 15, wherein the plurality of transitory values are combined by adding them together and performing a modulo p operation over the result.

18. The method of claim 15, wherein the prime number p is prefixed and the plurality of random keys is pre-generated upon start-up of a processing circuit or initiation of a session on the processing circuit.

19. The method of claim 15, wherein the plurality of random keys are used for a plurality of aggregate of verification codes associated with different distinct lists of memory elements.

20. The method of claim 1, wherein
  if the aggregate authentication code is stored in an insecure memory location, the aggregate authentication code is further protected by a mask prior to storage, and
  if the aggregate authentication code is stored in a secure memory location, the aggregate authentication code is stored without masking.

21. A device comprising:
  a memory device to store a list of inputs associated with memory elements in a memory space;
  a processing circuit coupled to the memory device, the processing circuit configured to
  generate an individual authentication code for each memory element in the list by combining a random key with a corresponding input in the list using a first operation;
  generate an aggregate authentication code by combining the individual authentication codes for each memory element in the list using a second operation;
  store the aggregate authentication code in the memory device, wherein the aggregate authentication code is configured to authenticate access to one or more elements in the memory space;
  verify the integrity of the list by comparing a newly generated instance of an aggregate authentication code over the memory elements to the stored aggregate authentication code; and
  discard the memory elements if the integrity verification fails.

22. The device of claim 21, wherein verifying the integrity of the list is triggered by expiration of a time-based interval or counter-based between verifications.

23. The device of claim 21, wherein verifying the integrity of the list is performed at an interval greater than a plurality of accesses of the memory elements in the list.

24. The device of claim 21, wherein the integrity of the list of elements is verified instead of checking the integrity of each individual memory element when it is accessed.

25. The device of claim 21, wherein the processing circuit is further configured to discard the individual authentication codes for the elements in the list after the aggregate authentication code is obtained.

26. The device of claim 21, wherein the processing circuit is further configured to
  verify the integrity of the list by checking that each memory element in the list satisfies one or more constraints.

27. The device of claim 21, wherein the memory elements are defined within a single memory heap region organized through the use of a meta-data structure.

28. The device of claim 21, wherein each memory element is a fixed-length data structure within a header block comprising meta-data information.

29. The device of claim 21, wherein the processing circuit is further configured to
  update the aggregate authentication code when a memory element in the list changes by: removing the previous individual authentication code for the changed memory element from the aggregate authentication code; and
  adding a new individual authentication code for the changed memory element to the aggregate authentication code.

30. The device of claim 21, wherein the processing circuit is further configured to
  update the aggregate authentication code when a memory element is removed from the list by:
    removing the previous individual authentication code for the removed memory element from the aggregate authentication code.

31. The device of claim 21, wherein the processing circuit is further configured to
  update the aggregate authentication code when a new memory element is added to the list by:
    adding a new individual authentication code for the new memory element to the aggregate authentication code.

32. The device of claim 21, wherein the aggregate authentication code is stored in a secure memory location, and the individual authentication code for each memory element is obtained by:
  obtaining a bounded list of n inputs associated with the memory element, where each input has a length of less than or equal to L;
  obtaining a prime number p, where p>L;
  generating a plurality of random keys, each key distributed within the range of 0 to p-1;
  combining each key in a subset of keys with a corresponding input in the list of n inputs to obtain a plurality of transitory values; and
  combining the plurality of transitory values and at least one unused key to generate the individual authentication code.

33. The device of claim 32, wherein each key in the subset of keys and the corresponding memory element in the list are combined by a multiplication.

34. The device of claim 32, wherein the plurality of transitory values are combined by adding them together and performing a modulo p operation over the result.

35. A device, comprising:
  means for defining a list of inputs associated with memory elements in a memory space;

means for generating an individual authentication code for each memory element in the list by combining a random key with a corresponding input in the list;

means for generating an aggregate authentication code by combining the individual authentication codes for each memory element in the list;

means for storing the aggregate authentication code in the memory device, wherein the aggregate authentication code is configured to authenticate access to one or more elements in the memory space; and means for verifying the integrity of the list by comparing a newly generated instance of an aggregate authentication code over the memory elements to the stored aggregate authentication code; and means for discarding the memory elements if the integrity verification fails.

36. The device of claim 35, wherein verifying the integrity of the list is triggered by expiration of a time-based interval or counter-based between verifications.

37. The device of claim 35, wherein the aggregate authentication code is stored in a secure memory location, and the individual authentication code for each memory element is obtained by:

obtaining a bounded list of n inputs associated with the memory element, where each input has a length of less than or equal to L;

obtaining a prime number p, where p>L;

generating a plurality of random keys, each key distributed within the range of 0 to p-1;

combining each key in a subset of keys with a corresponding input in the list of n inputs to obtain a plurality of transitory values; and combining the plurality of transitory values and at least one unused key to generate the individual authentication code.

38. A non-transitory processor-readable storage medium having one or more instructions which when executed by at least one processing circuit causes the at least one processing circuit to:

define a list of inputs associated with memory elements in a memory space;

generate an individual authentication code for each memory element in the list by combining a random key with a corresponding input in the list using a first operation;

generate an aggregate authentication code by combining the individual authentication codes for each memory element in the list using a second operation;

store the aggregate authentication code in the memory device, wherein the aggregate authentication code is configured to authenticate access to one or more elements in the memory space;

verify the integrity of the list by comparing a newly generated instance of an aggregate authentication code over the memory elements to the stored aggregate authentication code; and discard the memory elements if the integrity verification fails.

39. The non-transitory processor-readable storage medium of claim 38, wherein verifying the integrity of the list is triggered by expiration of a time-based interval or counter-based between verifications.

* * * * *